Figure 1:
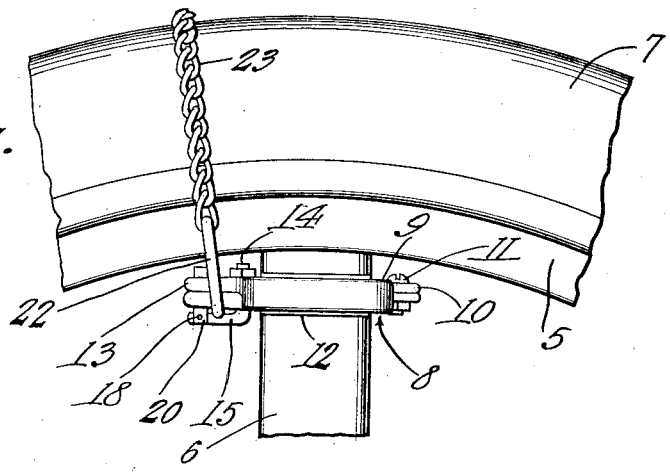

I. E. TATUM.
CLAMP.
APPLICATION FILED OCT. 4, 1919.

1,331,292.

Patented Feb. 17, 1920.

Witness
Ed. R. Lusby

Inventor
I. E. Tatum
By Norman T. Whitaker
his Attorney

UNITED STATES PATENT OFFICE.

IRA E. TATUM, OF GREENVILLE, MISSISSIPPI.

CLAMP.

1,331,292.  Specification of Letters Patent.  Patented Feb. 17, 1920.

Application filed October 4, 1919. Serial No. 328,353.

*To all whom it may concern:*

Be it known that I, IRA E. TATUM, a citizen of the United States, and a resident of Greenville, in the county of Washington and State of Mississippi, have invented new and useful Improvements in Clamps, of which the following is a specification.

This invention relates to clamps and has particular reference to that class of clamps designed to be used in connection with automobile wheels as a means for retaining a plurality of chains in position upon the automobile wheel to prevent skidding or slipping of the wheels of the automobile when traversing a muddy or slippery road-bed.

An important object of the invention is to provide in a device of the above mentioned character a means whereby the chain when hooked upon the clamp may be effectively locked thereon to prevent accidental removal or detachment therefrom.

A further object of the invention is to provide a device of the above mentioned character which is simple in construction, inexpensive to manufacture, reliable in use and capable of being easily installed upon the automobile wheel.

Other objects and advantages of the invention will be apparent during the course of the following description taken in connection with the accompanying drawings.

In the drawings, forming a part of this specification and wherein like numerals are employed to designate like parts throughout the same.

Figure 2:
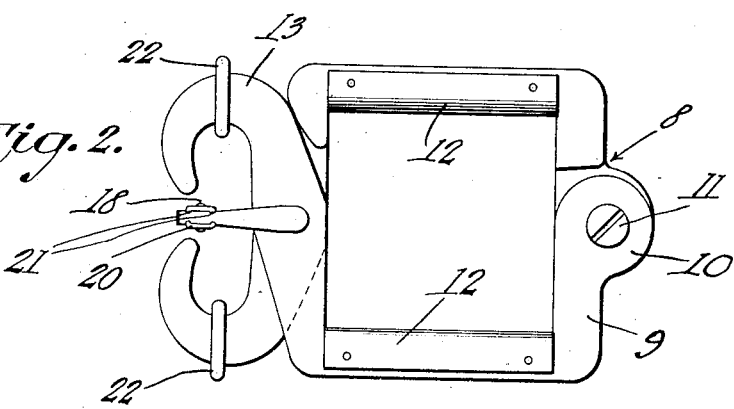
Figure 3:
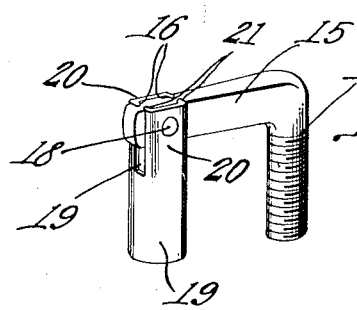

Figure 1 is a fragmental elevation of a portion of an automobile wheel having the device embodying my invention applied thereon, Fig. 2 is a face view of the device, and, Fig. 3 is a perspective view of a chain locking mechanism.

In the drawings, wherein for the purpose of illustration is shown a preferred form of my invention, the numeral 5 indicates a portion of an automobile wheel having spokes, one of which is indicated by the numeral 6, the rim 5 carrying thereupon a resilient tire 7. The device embodying my invention is indicated as a whole by the numeral 8 and is adapted to be clamped or secured to the spoke 6 as indicated in Fig. 1. The device comprises a pair of angularly bent clamping members 9 provided with enlarged ends as shown at 10, the members 9 being pivotally connected together by means of a screw or the like as shown at 11. The clamping members 9 are, as clearly shown in Fig. 2, of substantially a U-shaped construction and are provided with facing elements of preferably rubber as shown at 12 to prevent marring or scratching of the spoke 6 when the device is clamped thereto. The clamping members 9 are provided with hooked ends 13, each of which is bent to substantially a U-shape as shown in Fig. 2, the hooked ends being secured together when the device is clamped upon the spoke by means of a bolt 14 carrying an elongated arm 15 which is provided with depressions or transversely disposed notches 16. It will be noted that the arm 15 terminates substantially intermediate the hooked ends 13 and is provided with a lever 19' pivotally connected to the arm 15 by means of a suitable rivet or the like as shown at 18. The lever 19' is split as shown at 19 to provide a pair of arms 20 each carrying a pair of flanges 21 which are adapted to spring as a result of the resiliency of the arms 20 into the notches 16 when the lever 17 is moved to the position shown in Fig. 3.

In use, the device as a whole is clamped to the spoke 6, there being preferably a plurality of the devices clamped to the several spokes of the wheel. The device, when placed in position upon the spokes 6, as shown in Fig. 1, is locked by means of the bolt 14 and its hooked ends 13 are adapted to receive the eyelets or enlarged links 22 secured to the ends of an anti-skid chain 23 which is adapted to be passed around the rim 5 and the tire 7 of the wheel. In placing the eyelets or enlarged links upon the hooked ends 13 the lever 19' may be moved to an extended position to permit the chain to be easily placed in position after which the lever 19' is moved to the position shown in Fig. 3 whereupon the flanges 21 as a result of the resiliency of arms 20 seat themselves into the grooves 16. The lever 19', when moved to the position shown in Fig. 3, serves as a means for preventing accidental removal of the eyelets or links 22 from the hooked ends 13 as is apparent when considering the application of the device as shown and illustrated in Fig. 1.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. A clamp for securing an anti-skid chain to an automobile wheel comprising retaining elements pivotally connected to each other, a hook carried by each of said retaining elements, said hooks being adapted to receive the ends of the anti-skid chain, means for locking the retaining members in position upon the spoke of the wheel, and means carried by the first named means for preventing accidental removal of the ends of the anti-skid chain from said hooks.

2. A clamp for securing an anti-skid chain to an automobile wheel comprising retaining elements pivotally connected to each other, a hook carried by each of said retaining elements, said hooks being adapted to receive the ends of the anti-skid chain, means for locking the retaining members in position upon the spoke of the wheel, means carried by the first named means for preventing accidental removal of the ends of the anti-skid chain from said hooks, the latter named means comprising a lever pivotally connected to the first named means, and resilient means for retaining said lever in a given position.

IRA E. TATUM.